Patented Aug. 17, 1954

2,686,767

UNITED STATES PATENT OFFICE 2,686,767

AQUEOUS DISPERSION OF FLUORO-CHLOROCARBON POLYMERS

Irving Green, Bayonne, N. J., assignor to The M. W. Kellogg Company, Jersey City, N. J., a corporation of Delaware No Drawing. Application December 22, 1950, Serial No. 202,435

9 Claims. (Cl. 260—29.6)

This invention relates to dispersions of high molecular weight polymers of perfluorochlorocarbons as the monomers. In one aspect this invention relates to dispersions or suspensions of the normally waxy and resinous polymers of the single monomer trifluorochloroethylene. In another aspect the invention relates to a method for applying resinous homo polymers of trifluorochloroethylene to surfaces.

Polymers of trifluorocholorethylene possess certain physical and chemical characteristics which make the polymers particularly desirable as surface coatings and impregnants. The resinous polymer produced from the single monomer trifluorochloroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four-fifths of the weight of the polymer of the single monomer is made of the two halogens, fluorine and chlorine. The quick quenched resinous polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The resinous polymer is flexible and resilient, has a high impact strength at low temperatures and is resistant to thermal shock. The polymer is not wetted by water and is unaffected by high humidity. Table I below shows some of the electrical characteristics of the normally solid polymer under high frequency:

TABLE I

Solid polymer of trifluorochloroethylene

| Electrical Frequency, cycles/sec. | Dielectric Constant E | Dielectric Power Loss Tan | |
|---|---|---|---|
| $1 \times 10^2$ | 2.72 | 0.022 | 0.0011 |
| $1 \times 10^3$ | 2.63 | 0.27 | 0.0014 |
| $1 \times 10^4$ | 2.53 | 0.023 | 0.0012 |
| $1 \times 10^5$ | 2.46 | 0.0135 | 0.0008 |
| $1 \times 10^6$ | 2.43 | 0.0082 | 0.0004 |
| $1 \times 10^7$ | 2.35 | 0.0060 | 0.0003 |
| $1 \times 10^8$ | 2.30 | 0.0028 | 0.0002 |
| $3 \times 10^8$ | 2.30 | 0.0030 | |
| $3 \times 10^9$ | 2.30 | 0.0028 | 0.0002 |
| $1 \times 10^{10}$ | 2.29 | 0.0039 | 0.0002 |
| $2.5 \times 10^{10}$ | 2.29 | 0.0055 | |

Other physical properties of the resinous polymer are shown below in Table II:

TABLE II

| Property | Test Result |
|---|---|
| Specific gravity | 2.1. |
| Tensile strength at 86° F., p. s. i. | 9,400. |
| Elongation at break 86° F., percent | 127. |
| Coefficient of linear expansion (−320° F. to 167° F.). | $3.5 \times 10^{-5}$. |
| Specific resistance, ohms | $5 \times 10^{17}$. |
| Water absorption, percent | 0.00. |
| Outdoor weathering | no detectable change. |

The resinous type polymers produced from the single monomer trifluorochloroethylene may be prepared by polymerizing the monomer in the presence of a suitable organic peroxide such as bistrichloracetyl peroxide, as the polymerizing agent, at a temperature between about −20 and about 25° C., preferably at a temperature of about −16° C. At a temperature of −16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

To distinguish the resinous polymer over the oils and waxes produced with the same monomer, the polymer is described by reference to its no strength temperature. A no strength temperature (N. S. T.) of between about 210° C. and about 350° C. is characteristic of a normally solid polymer of the above preparation having plastic characteristics. Best plastic characteristics of the normally solid polymer are observed at N. S. T. values between about 240° C. and about 340° C. The N. S. T. values of the polymer depend upon such factors as temperature, residence time, concentration of promoter, pressure, etc. Since this invention does not relate to the method of producing the polymer of particular characteristics, further discussion thereof will not be undertaken. Other applications have been filed relating to the preparation of the polymer per se.

The no strength temperature (N. S. T.) is determined in the following manner: A sample of polytrifluorochloroethylene is hot pressed into a $\frac{1}{16}$″ thick sheet and cut into a strip of $\frac{1}{8}$″ x $\frac{1}{16}$″ x $1\frac{5}{8}$″. The strip is notched $\frac{5}{8}$″ from the top so that the dimension at the notch shall be $\frac{1}{16}$″ x $\frac{1}{16}$″. A fine wire and a standard weight is attached to one end of the strip. The weight of the polymer plus the wire and standard weight shall equal ½ gram. The strip is then attached in a furnace and fixed vertically therein. The temperature of the sample is increased at a rate of about 1½° C. per minute in the furnace as the breaking temperature is approached. The no strength temperature is the breaking temperature of the sample. Differences of about 5° C. are considered significant.

As a result of the excellent chemical and physical properties of the polymers of trifluorochloroethylene, the polymers have use as coatings on various surfaces in order to make such surfaces corrosion resistant to chemicals. The good electrical, non-wetting and flame resistant properties of the polymer also makes its use feasible as insulating coatings on electrical conductors, condensers and various parts used in electrical apparatus and circuits. The resinous and wax polymers may be applied to various surfaces, including flat and curved surfaces, wires, fabrics, yarn, paper, leather, cables, cans, glass, wood, etc. The resinous polymer may be applied to metal wires, particularly aluminum, iron and copper, to act as an insulator on the surface of the wires. The coating of fabrics with polytrifluorochloroethylene renders the fabrics fireproof and shrink resistant and increases the strength of the fabrics. Heretofore the resinous polymer has been applied to the surface by melting the polymer and applying it to the surface, such as by extrusion, or by dissolving the solid polymer in a suitable solvent, coating the surface with the solvent and subsequently evaporating the solvent. Applying the solid polymer by extrusion to the surfaces has certain obvious disadvantages. One of these disadvantages is the fact that relatively high temperatures must be employed and at such high temperatures there is a tendency for the resinous polymer to decompose. The decomposition of the polymer not only affects its chemical and physical characteristics, but also the products of decomposition may attack the surface which is being coated. It is also difficult to obtain thin films upon the surface when applying the polymer by extrusion, the use of thin films being highly desirable in coating wires used, for example, as aromatures of motors. The solution method of application also has certain disadvantages. The substantial insolubility of the resinous polymer in most solvents and its high viscosity with low solids content in other solvents makes this method somewhat impractical. Those solvents which have been found useful for dissolving resinous polytrifluorochloroethylene are relatively expensive which necessitates their recovery after evaporation. The solvents may also be corrosive to the surface being coated at the condition of application. The relatively high viscosity of solutions of plastic polytrifluorochloroethylene also makes their application difficult and the solutions must usually be applied at substantially elevated temperatures.

It is the object of this invention to form stable dispersions or suspensions of normally solid polymers of trifluorochloroethylene, both waxes and resins.

Another object of this invention is to provide a method for applying resinous polymers of trifluorochloroethylene of modified characteristics to surfaces.

Still another object of this invention is to provide a method and material for dispersing and plasticizing the resinous polymer of trifluorochloroethylene in such a form that the dispersion may be applied to surfaces with a minimum of application difficulties and maximum of safety.

Another object of this invention is to provide a dispersion of resinous polymer of trifluorochloroethylene and a plasticizer in high concentrations and low viscosities in a liquid medium of low cost.

According to this invention a finely divided resinous polymer of trifluorochloroethylene is directly dispersed or suspended in an aqueous liquid dispersing medium. Since the resinous polymer of trifluorochloroethylene is not wetted by water, it is necessary to include in the aqueous dispersing medium a suitable wetting agent. In general, these wetting agents for the resinous polymer of trifluorochloroethylene are the water soluble organic oxygenated or "oxy" compounds, or ketones, such as hereinafter enumerated. It has been found that such wetting agents for the resin are: the alcohols including both the mono and poly functional alcohols having not more than 8 carbon atoms per molecule, the ketones having not more than 6 carbon atoms per molecule, and the substituted polyethylene oxides of the non-ionic type wetting agents having not more than 30 carbon atoms per molecule. Suitable monohydric alcohols include: methanol, ethanol, propanol, butanol, pentanol, hexanol and octanol; butanol and pentanol being the preferred mono functional alcohols. Of the poly functional alcohols, the alkoxy ethanols and the alkoxy alkoxy ethanols are preferred, such, for example, as methoxy ethanol, ethoxy ethanol, butoxy ethanol and ethoxy ethoxy ethanol.

Of the ketones, acetone, methyl ethyl ketone and diethyl ketone are preferred. The preferred polyethylene oxides include: the polyethylene oxide substituted at one terminus with a thioalkyl group and polyethylene oxide substituted at one terminus with an alkylphenoxy. These wetting agents may be used alone or in admixture with each other, particularly, mixtures of the substituted polyethylene oxides, such as are available on the commercial market, are suitable.

The concentration of the resinous polymer of trifluorochloroethylene in the total aqueous dispersion is preferably between about 10 and about 35 per cent by weight but other concentrations are contemplated without departing from the scope of the invention. Usually the particle size is between about 0.1 and about 10 microns in diameter, preferably less than 3 microns. The quantity of wetting agent employed will, of course, depend upon the properties of the wetting agent itself. In general, from about 0.1 per cent by weight up to the solubility of the wetting agent in water may be employed in the aqueous dispersing medium. However, the maximum quantity of wetting agent does not normally exceed 50 per cent by weight of the total aqueous dispersing medium.

According to this invention it has been found desirable in making up the dispersion or suspension of the resinous polymer to include a suitable plasticizer for the plastic trifluorochloroethylene polymer. In this manner the ultimate film obtained is more resilient and pliant, with less tendency for the film to tear or scratch. The use of a plasticizer also prevents crystallization of the resinous film with age. Such plasticizers comprise normally liquid and waxy polymers of trifluorochloroethylene, which are of lower molecular weight than the resin. The liquid and wax polymers of trifluorochloroethylene are produced in a similar manner as described with regard to the production of the plastic polymer of trifluororochloroethylene. In general, the wax and liquid polymers are obtained at higher temperatures and with greater concentrations of promoter, usually with the aid of a chain transfer solvent, than employed in the manufacture of resinous polymers. Other plasticizers which may be incorporated with the dispersing medium comprise Aroclor (chlorinated diphenyl) and Zyrox (chlorinated diphenyl methane). The plasticizers are incorporated in the dispersing medium in substantially the same amount as the polymer, usually in the range of about 10 to 25 weight per cent of the total aqueous dispersion.

According to this invention, films of 0.1 to 5 mils in thickness of normally solid polymer of trifluorochloroethylene may be applied to metal surfaces or the like.

To make up the dispersion resinous polymer of trifluorochloroethylene is ground in a mill to a sufficient extent that the fineness of the powdered polymer is such that it passes a 40 mesh screen or finer. Thereafter, the powdered polymer is mixed with the aqueous dispersing medium of the composition as previously described. The mixture of resinous polymer and liquid dispersing medium is then introduced into a ball mill or pebble mill for further grinding. The ball milling is continued for a period of at least 6 hours depending upon the initial fineness of the powder. Generally, the ball milling operation is effected over a period of about 25 to 50 hours. Any method of grinding and pulverizing the powdered polymer may be employed without departing from the scope of this invention. Roller mills, colloid mills, gear pumps, and other conventional devices may be employed. After a sufficient length of ball milling, the aqueous mixture contains finely dispersed resinous polymer of about 1 micron in diameter which does not settle completely upon prolonged standing.

In forming a dispersion including a waxy polymer of trifluorochloroethylene as a plasticizer, the wax is, preferably, first dissolved in a solvent which is miscible with the aqueous dispersing medium, such as acetone, and then to the resulting solution is added enough water to precipitate the wax. The resulting suspension of wax is concentrated by settling and decantation and the concentrated suspension is then added to the dispersion of the plastic. The concentration of the wax in the dispersion will depend upon the desired amount of plasticization intended.

Since it is often desirable to obtain dispersions of higher concentrations than can be obtained directly by ball milling, such higher concentrations are obtained by permitting the dispersion or suspension to settle or densify and decanting the supernatant liquid. Using this method, dispersions or suspensions as high as 35 per cent may be obtained without difficulty. It must be pointed out that although the dispersion settles it does not agglomerate and only settles slowly over a period of several days. Most of the settling takes place within three days; only negligible settling takes place after three days.

Articles may be coated by dipping the article into the above liquid mixture followed by fusion or sintering. A coating of not more than about one mil in thickness can be obtained by a single dip. Usually, two, three or more dips, with fusion between dips, are required to obtain the desired thickness of uniform film upon the surface of the article. After each dip the surface containing the deposited plasticized resin thereon is fused or sintered by heating to a temperature of about 200° C. or higher, depending on the amount and type of plasticizer employed, for about 30 seconds to about 25 minutes. Shorter periods of time within the above range are permissible with higher temperatures of fusion. The lower temperatures of fusion are preferred since the tendency of the polymer to decompose and attack metal surfaces is minimized. The procedure of dipping and fusing may be repeated until the desired film thickness is obtained. Other methods of application include spraying and painting. On rigid metal surfaces, it may be desirable to lower the temperature following fusion at a slow rate, giving better adhesion. On the other hand, when flexibility and toughness are required, a quick quench of the fused film will be necessary to obtain an essentially amorphous polymer.

Fillers and pigments may be added to the completed dispersion with gentle stirring or by addition prior to the grinding operation in the pebble mill. Examples of stable fillers and pigments are: calcium silicate, calcium carbonate, carbon black, titanium dioxide, phthalocyanines and chrome green, with particle dimensions of approximately 0.5 micron in diameter.

The following examples are offered as a better understanding of the invention and should not be construed as unnecessarily limiting thereto.

EXAMPLE I

In this example, a resinous polymer of trifluorochloroethylene having an N. S. T. of about 300° C. was dispersed in a water solution containing approximately 6 weight per cent normal-butyl alcohol. The dispersion was prepared by pouring 176.3 grams of 300° C. N. S. T. resin into 998.7 grams of a 6 weight per cent aqueous solution of normal-butyl alcohol. This amounted to about 15 per cent by weight of resin in the total mixture. The slurry mixture was then charged to a one gallon size pebble mill together with 8 pounds of flint pebbles as a grinding medium. The pebble mill was rotated at aproximately 72 R. P. M. for 65 hours. Thereafter, a dispersion containing the resinous polymer of trifluorochloroethylene was removed and allowed to settle about three days and the supernatant liquid then decanted. The concentration of resin in the total dispersion after settling and decantation was approximately 20 per cent by weight. This dispersion gave good visual coverage when sprayed or dipped into and dried to a white powder material. The deposited particles were then fused at about 250° C. The resulting film after fusion was similar in character and quality to the films obtained in nonaqueous dispersions of the resin, as described in the copending application Serial No. 136,168, filed December 30, 1949.

EXAMPLE II

In this example, a resinous polymer of trifluorochloroethylene having an N. S. T. of about 300° C. was dispersed in a water solution containing approximately 30 per cent by weight of ethoxy ethanol. The dispersion was prepared by pouring 176.3 grams of 300° C. N. S. T. resin into 998.7 grams of a 30 weight per cent aqueous solution of ethoxy ethanol. This amounted to about 15 per cent by weight of resin in the total mixture. The slurry mixture was then charged to a one gallon size pebble mill together with 8 pounds of flint pebbles as a grinding medium. The pebble mill was rotated at approximately 72 R. P. M. for 65 hours. Thereafter, a dispersion containing the resinous polymer of trifluorochloroethylene was removed and allowed to settle about three days and the supernatant liquid then decanted. The concentration of resin in the total dispersion after settling and decantation was about 20 per cent by weight. This dispersion gave good visual coverage when sprayed or dipped into and dried to a white powder material. The deposited particles were fused at about 250° C.

EXAMPLE III

In this example, a resinous polymer of trifluorochloroethylene having an N. S. T. of about 300° C. was dispersed in a water solution containing approximately 27 per cent by weight of methyl ethyl ketone. The dispersion was prepared by pouring 176.3 grams of 300° C. N. S. T. resin into 998.7 grams of a 27 weight per cent aqueous solution of methyl ethyl ketone. This amounted to about 15 per cent by weight of resin in the total mixture. The slurry mixture was then charged to a one gallon size pebble mill together with 8 pounds of flint pebbles as a grinding medium. The pebble mill was rotated at approximately 72 R. P. M. for 65 hours. Thereafter, a dispersion containing the resinous polymer of trifluorochloroethylene was removed and allowed to settle about three days and the supernatant liquid then decanted. The concentration of resin after settling and decantation was about 20 per cent by weight. This dispersion gave good visual coverage when sprayed or dipped into and dried to a white powder material. The deposited particles were fused at about 250° C.

EXAMPLE IV

In this example, a resinous polymer of trifluorochloroethylene having an N. S. T. of about 300° C. was dispersed in a water solution containing approximately 0.1 weight per cent of a mixture of polyethylene oxides substituted at one terminus with ditertiary butyl-phenoxy groups (Triton X–100). The dispersion was prepared by pouring 176.3 grams of 300° C. N. S. T. resin into 998.7 grams of a 0.1 weight per cent aqueous solution of the substituted polyethylene oxides. This amounted to about 15 per cent by weight of resin in the total mixture. The slurry mixture was then charged to a one gallon size pebble mill together with 8 pounds of flint pebbles as a grinding medium. The pebble mill was rotated at approximately 72 R. P. M. for 65 hours. Thereafter, a dispersion containing the resinous polymer of trifluorochloroethylene was removed and allowed to settle about three days and the supernatant liquid then decanted. The concentration of resin after settling and decantation was about 20 per cent by weight. This dispersion gave good visual coverage when sprayed or dipped into and dried to a white powder material. The deposited particles were then fused at about 250° C.

EXAMPLE V

A waxy polymer of trifluorochloroethylene, M. P. 40° C., to be used as a plasticizer was heated to 150° C. and the molten wax dissolved in a minimum of acetone. To the wax solution cooled to room temperature was added water which precipitated the wax forming a suspension of fine wax particles. The suspension was allowed to settle and concentrated by decanting the maximum possible amount of supernatant liquid. The resulting wax suspension had a wax content of about 25 weight per cent. The amount of wax suspension required to prepare a dispersion containing 25 weight per cent wax based on resin was added to a dispersion prepared as in Example I. The resulting dispersion was a satisfactory aqueous dispersion containing about 20 weight per cent resin.

Thin polytrifluorochloroethylene resinous coatings possessed good mechanical and electrical properties and good chemical resistance.

Paper, fabric and ceramic sheets coated with trifluorochloroethylene polymers are used as jackets for the insulation of wire and cable. The fabrics or papers are applied in the form of tapes, sheets or braids. For high temperature resistance insulators the straight polytrifluorochloroethylene resinous dispersion is used to coat the wrapping. Polytrifluorochloroethylene wax-resin dispersions may be used in applications where high temperature resistance is not needed. A final polytrifluorochloroethylene coat may be placed over the wrapped wire, if desirable.

The dispersions may be used as saturants for the treatment of asbestos and glass yarns and fabrics (plus fusion treatment) employed on a number of small power cables, switchboard and stove wires.

Protection of metal against the various service conditions to which it may be exposed is solved in numerous cases by coating the exposed surface with polytrifluorochloroethylene applied from dispersion. A sepcific example is the coating of large gate valves made of steel. The valves are to be used in a highly corrosive acid solution at 80–90° C. The surface of the metal to be coated is pretreated by solvent dip followed by mild pickling in order to obtain optimum adhesion of the polytrifluorochloroethylene film. A 20 per cent resinous dispersion is passed over the surface to be coated and the coated valve drained, air-dried and fused for two minutes at 390° C. This operation is repeated in order to make certain that no exposed surfaces remain. The resulting continuous film had a thickness of 1.5 mils and successsfully protected the gate valve from corrosion. Another example is the coating of the inside of an aluminum tank with polytrifluorochloroethylene wax-resin dispersion so that it will withstand the action of white-fuming and dilute nitric acid and vapors at temperatures up to 80° C. The tank is partially filled with the polytrifluorochloroethylene wax-resin dispersion, rotated to completely wet the internal surface, drained, dried by passing a warm inert gas into the tank, and fused at 200° C. for ten minutes. This operation is repeated two more times and a continuous non-porous film 1 mil thick built up which meets the desired specification.

The above wax-resin dispersion is suited for the coating of cans. A fusion temperature of 200° C. for ten minutes is suitable in the can coating industry and this inert film formed does not impart odor, color, or taste to the can ingredients.

The dispersion is deposited on the surface of the metal to be used in making cans by means of conventional roller coating techniques.

The present invention includes within its scope polymers of trifluorochloroethylene which include a minor amount of other monomers, such as vinyl chloride, tetrafluoroethylene, perfluoropropene and acrylonitrils. The use of these other monomers is limited to less than about 15 per cent of the polymer, preferably less than about 5 per cent. In some instances it is desirable to use small quantities of other monomers in combination with the principal monomer trifluorochloroethylene in order to impart modified characteristics to the resulting polymer, but the quantity of other monomer is small as above.

Having described my invention, I claim:

1. A dispersion which comprises a resinous polymer of trifluorochloroethylene and a waxy polymer of trifluorochloroethylene as a plasticizer dispersed in a liquid dispersing medium comprising water and a water soluble wetting agent of the class consisting of alcohols having not more than 8 carbon atoms per molecule, ketones having not more than 6 carbon atoms per molecule and substituted polyethylene oxides having not more than 30 carbon atoms and having at one terminus a substituent group of the class consisting of alkylphenoxy groups and thioalkyl groups, the concentration of plastic in the total dispersion being between about 10 and about 35 per cent by weight, and the concentration of plasticizer in the total aqueous dispersion being between about 10 and about 25 per cent by weight, said dispersion having been formed by directly admixing a powdered polymer of trifluorochloroethylene having a particle size between about 0.1 and about 10 microns in diameter and said plasticizer in finely divided form with said liquid dispersing medium.

2. The dispersion of claim 1 in which said water soluble wetting agent is butanol.

3. The dispersion of claim 1 in which said water soluble wetting agent is pentanol.

4. The dispersion of claim 1 in which said water soluble wetting agent is ethoxy ethanol.

5. The dispersion of claim 1 in which said water soluble wetting agent is acetone.

6. The dispersion of claim 1 in which said water soluble wetting agent is polyethylene oxide substituted at one terminus with an alkylphenoxy group.

7. A dispersion which comprises a resinous polymer of trifluorochloroethylene having a no strength temperature between about 200° C. and about 350° C. and a waxy polymer of trifluorochloroethylene of lower molecular weight than said plastic polymer as a plasticizer dispersed in a liquid medium consisting essentially of water and butanol as a wetting agent.

8. A method for preparing a stable aqueous dispersion of a resinous polymer of trifluorochloroethylene containing a waxy polymer of trifluorochloroethylene as a plasticizer which comprises dissolving the plasticizer in a suitable solvent, adding water to the solution of plasticizer to effect precipitation of the plasticizer as finely divided particles, permitting the precipitated plasticizer to settle from the resulting mixture, decanting supernatant liquid from said resulting mixture, and adding the finely divided plasticizer thus obtained to an aqueous dispersion of a resinous polymer of trifluorochloroethylene containing a water soluble wetting agent of the class consisting of alcohols having not more than 8 carbon atoms per molecule, ketones having not more than 6 carbon atoms per molecule and substituted polyethylene oxides having not more than 30 carbon atoms and having at one terminus a substituent group of the class consisting of alkylphenoxy groups and thioalkyl groups.

9. The method of preparing a stable aqueous dispersion of a plastic polymer of trifluorochloroethylene having a no strength temperature between about 200° C. and about 350° C. containing a plasticizer which comprises dissolving a waxy polymer of trifluorochloroethylene of lower molecular weight than said plastic polymer in acetone, adding water to the resulting wax-acetone solution to precipitate the waxy polymer as fine particles, allowing the resulting mixture to settle, decanting the supernatant liquid from the settled mixture, and adding the resulting finely divided wax to an aqueous dispersion of a resinous polymer of trifluorochloroethylene containing at least one water soluble compound selected from a group consisting of alcohols having not more than 8 carbon atoms per molecule, ketones having not more than 6 carbon atoms per molecule and substituted polyethylene oxides having not more than 30 carbon atoms and having at one terminus a substitutent group of the class consisting of alkylphenoxy groups and thioalkyl groups.

References Cited in the file of this patent

UNITED STATES PATENTS

| Number | Name | Date |
|---|---|---|
| 2,047,968 | Jacobsen | July 21, 1936 |
| 2,478,229 | Berry | Aug. 9, 1949 |
| 2,531,134 | Kropa | Nov. 21, 1950 |
| 2,543,530 | Kropa | Feb. 27, 1951 |
| 2,581,454 | Sprung | Jan. 8, 1952 |

OTHER REFERENCES

Official Digest No. 262, November 1946, pages 503 and 504.